United States Patent [19]

Adachi

[11] Patent Number: 4,682,215
[45] Date of Patent: Jul. 21, 1987

[54] CODING SYSTEM FOR IMAGE PROCESSING APPARATUS

[75] Inventor: Eiichi Adachi, Atsugi, Japan

[73] Assignee: Ricoh Company, Ltd., Tokyo, Japan

[21] Appl. No.: 738,351

[22] Filed: May 28, 1985

[30] Foreign Application Priority Data

May 28, 1984 [JP] Japan ................................ 59-108029
Feb. 14, 1985 [JP] Japan ................................ 60-25146
Feb. 14, 1985 [JP] Japan ................................ 60-25147

[51] Int. Cl.$^4$ ............................................. H04N 1/46
[52] U.S. Cl. ........................................ 358/75; 358/260; 358/261
[58] Field of Search ........................... 358/75, 261, 260

[56] References Cited

U.S. PATENT DOCUMENTS 4,441,208  4/1984  Iida ..................................... 358/261
4,494,151  1/1985  Liao ..................................... 358/261
4,543,612  9/1985  Matsunaga ......................... 358/261

Primary Examiner—Michael A. Masinick
Attorney, Agent, or Firm—Oblon, Fisher, Spivak, McClelland & Maier

[57] ABSTRACT

A coding system for processing color images outputs coded data associated with a unit block with a particular one of the coded data which belongs to a predetermined level plane heading the others, while omitting those coded data which do not include valid data. Codewords adapted to code level plane information are utilized as level plane identification signals. Color information is identified. A color mode ZERO bit and a color mode ONE bit representative of the identified color information are inserted immediately before data in a line-by-line code format, whereby color image signals are transmitted.

3 Claims, 17 Drawing Figures

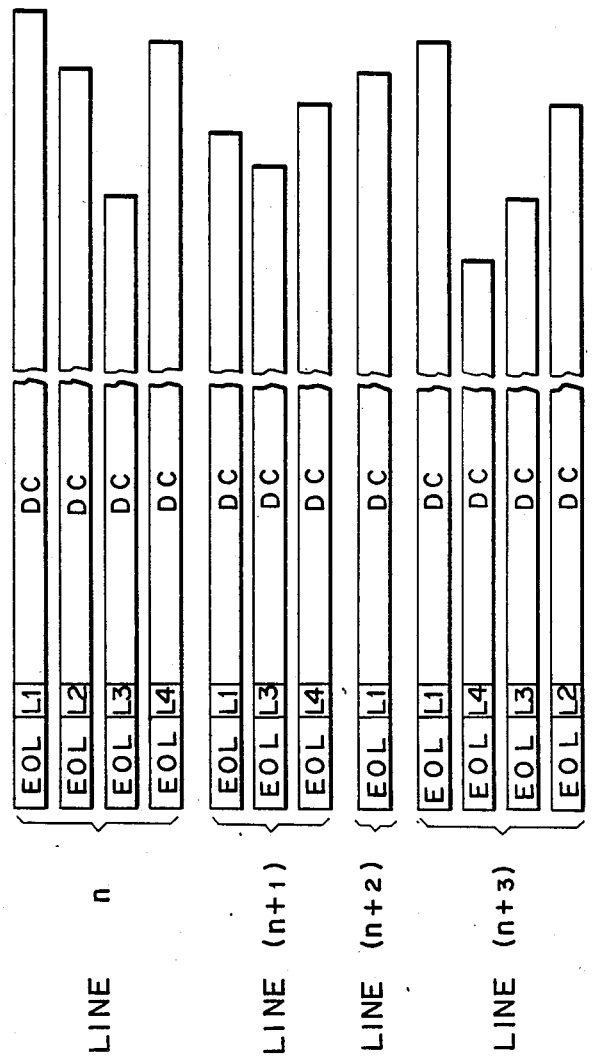

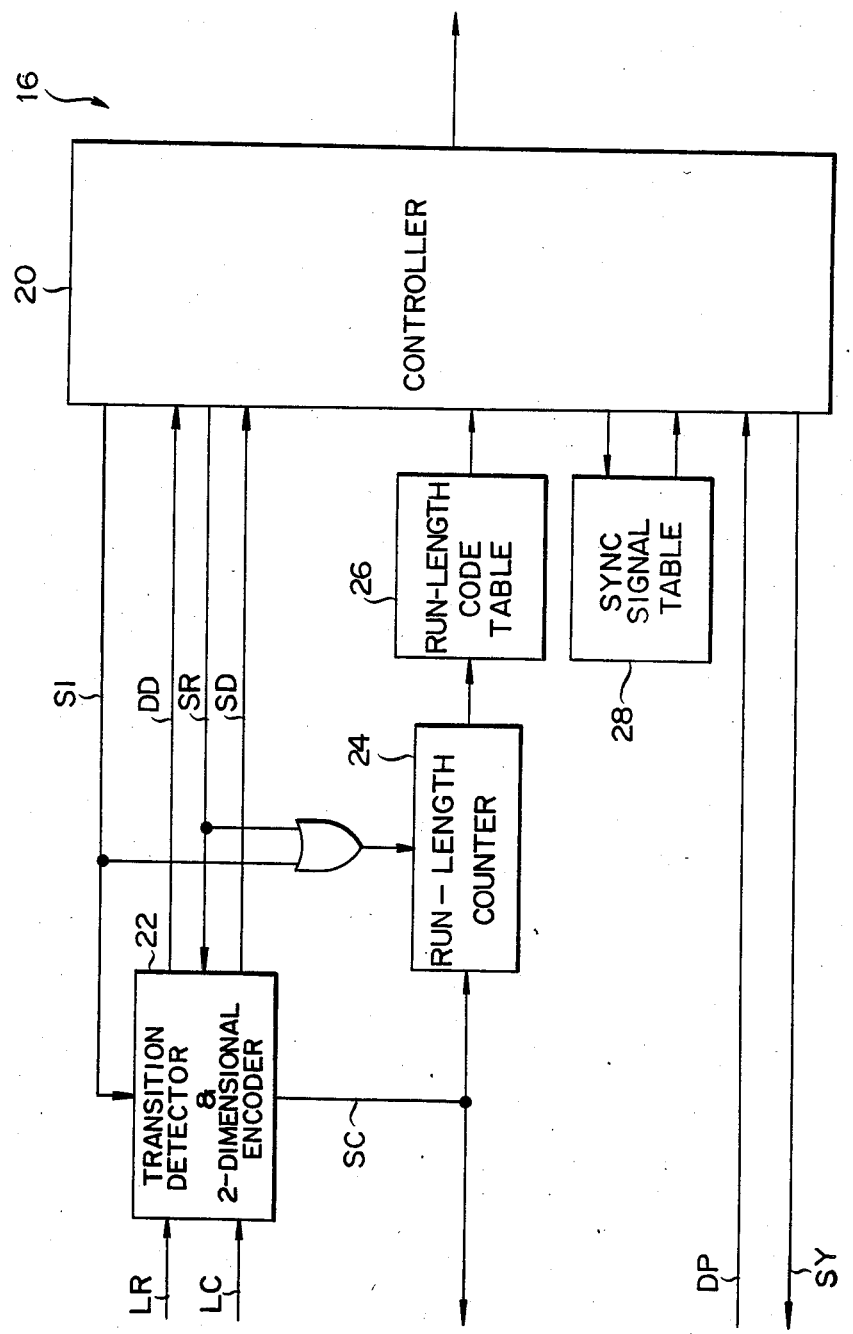

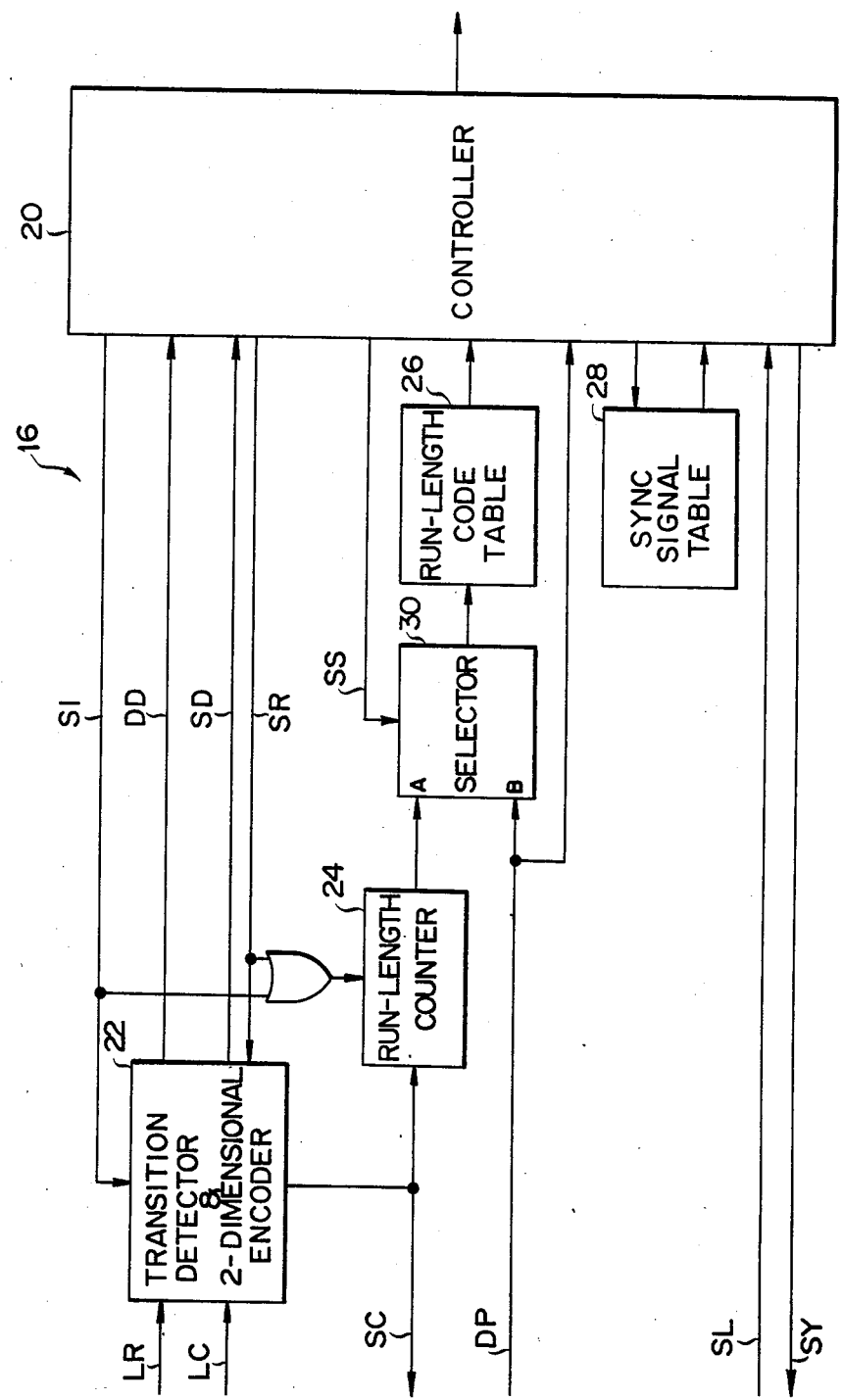

FIG. 13
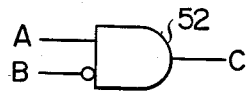
| A | B | C |
|---|---|---|
| 0 | 0 | 0 |
| 0 | 1 | 0 |
| 1 | 0 | 1 |
| 1 | 1 | 0 |
FIG. 14
| CM0 | CM1 | CONDITION |
|---|---|---|
| 0 | 0 | — |
| 0 | 1 | BLACK LINE OUTPUT (OUTPUT OF 54) |
| 1 | 0 | RED LINE OUTPUT (OUTPUT OF 56) |
| 1 | 1 | RED LINE OUTPUT OF COMBINED BLACK & RED LINES (OUTPUT OF 56) |
FIG. 16
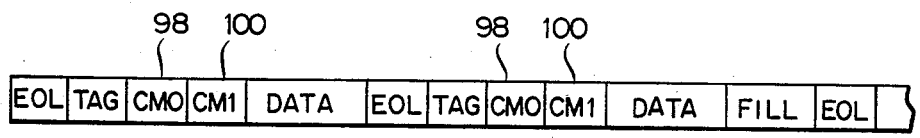

CODING SYSTEM FOR IMAGE PROCESSING APPARATUS

BACKGROUND OF THE INVENTION

1. Field of the Invention

The present invention relates to a coding system for a facsimile apparatus or like image processing apparatus which processes color images. More particularly, the present invention relates to a coding system of the kind which divides image information which are read in multiple levels into a plurality of level planes and, then, codes the information on a level plane basis, and a coding system which allows even a black-white facsimile apparatus to transmit color image signals without resorting to substantial remodeling of its data compression device.

2. Discussion of Background

In an image processing apparatus such as a facsimile apparatus, images which are colored are decomposed into a plurality of color components (usually three primary colors) and then read component by component so as to provide color plane information associated respectively with the components. Concerning halftone images, the apparatus reads them in terms of multi-level image signals each having a plurality of bits and, then, provides level planes each covering data in the corresponding bits of the image signals, thereby processing the images on a level plane basis as image signals.

Generally, image information are far greater in amount as well as in redundancy than other kinds of information. In an apparatus for transmitting image informations such as a facsimile apparatus or an apparatus for storing image information such as a video file apparatus, processing picture information as it is would make the efficiently significantly poor due to the characteristics particular to image information as mentioned above and, in light of this, coding which is effective to reduce the redundancy is performed so as to transmit or store the so coded data. A Group 3 facsimile apparatus, for example, compresses image information either in a one-dimensional coding mode (MH coding mode) or in a two-dimensional coding mode (MR coding mode) in order to enhance the transmission efficiency.

The coding systems stated above commonly use one document scanning line as a unit. Specifically, in the one-dimensional coding mode, state transistions of pixels are detected to code the run-length between the transitions, while in the two-dimensional coding mode one line is one-dimensionally coded first and then K−1 consecutive lines, at maximum, are two-dimensionally coded. The two-dimensional coding is based on a sequential procedure in which the positions of transition pixels in a line being currently coded are coded referencing the positions of their corresponding reference pixels in a coding line or a reference line immediately before the coding line. After the coding line has been coded, it serves as a reference line for the next coding line (see CCITT Recommendation T.4).

An exemplary data format provided by the one-dimensional coding mode is shown in FIG. 1, and an exemplary data format provided by the two-dimensional coding mode in FIG. 2. In the format associated with the one-dimensional coding mode, coded data DC relating to consecutive lines are separated from each other by an end-of-line (EOL) code adapted for discrimination. In the format associated with the two-dimensional coding mode, a tag bit TAG represenative of a particular coding mode of coded data CD intervenes between an EOL code and the data CD.

Color plane information provided by reading color images and level plane information provided by reading halftone images as previously described may be coded as follows. The information are coded on a scanning line basis and in any one of the above-discussed one-dimensional and two-dimensional coding modes depending upon the level plane. The resulting codes are arranged in the order of scanning lines, while identification data representative of a particular level plane is added to the head of coded data.

Such a system derives the format shown in FIG. 3 in the case of the one-dimensional coding mode and the format shown in FIG. 4 in the case of the two-dimensional coding mode, by way of example. Specifically, in accordance with the one-dimensional coding mode, a level plane code L is positioned between an EOL code and coded data DC, while in accordance with the two-dimensional coding mode a level plane code L is positioned between an EOL code and a tag bit TAG. In Japanese Unexamined Patent Publication (Kokai) No. 68973/1982, for example, the level plane codes L are implemented using Gray codes which are shown in Table 1 below.

TABLE 1

| DECIMAL NUMBER | GRAY CODE |
| --- | --- |
| 15 | 1000 |
| 14 | 1001 |
| 13 | 1011 |
| 12 | 1010 |
| 11 | 1110 |
| 10 | 1111 |
| 9 | 1101 |
| 8 | 1100 |
| 7 | 0100 |
| 6 | 0101 |
| 5 | 0111 |
| 4 | 0110 |
| 3 | 0010 |
| 2 | 0011 |
| 1 | 0001 |
| 0 | 0000 |

In Table 1, the decimal numbers are associated with densities of level planes in one-to-one correspondence.

Such a Gray code scheme, however, brings about the following problem in providing level plane codes.

Assuming an occurrence that white has continued over 2,048 bits in the one-dimensional coding mode, for example, then the level plane code L is "0000" because the density is zero, while a MH (modifid Huffman) code representative of the 2,048 bits of white is "000000010011". In this condition, the four ZEROs constituting the level plane code L and the seven consecutive ZEROs of the codeword and one ONE at the eighth bit of the codeword provide the same content as an EOL code, "000000000001", thereby impairing the individuality of the EOL code. Likewise, assuming a zero-level line to be two-dimensionally processed and a non-compression mode, the level plane signal L is "0000", the tag bit TAG is "0", and the associated codeword is "0000001", again constituting a false EOL code to impair the individuality of the latter.

One approach to solve the above problem is the use of special codes as the level plane codes which are not the Gray codes but those in which more than three ZEROs do not appear continuously. Another approach is ONE insertion processing which, concerning data other than EOL codes, inserts a ONE just after a stream of consecutive ZEROs. However, the special code scheme is undesirable because it excessively limits the use of codes, while the ONE insertion scheme cannot be implemented without the need for a complicated apparatus construction.

Codes provided by the above-discussed one-dimensional coding mode may be formatted as shown in FIG. 5. As shown, level plane codes L1–L4 respectively are inserted between EOL codes and coded data DC in corresponponence with the level planes of their associated coded data DC. The four streams of coded data DC are arranged one after another on the basis of a unit block (in this case, one scanning line). This system gives rise to a problem due to the fact that the coded data DC in all the level planes are outputted. Specifically, assuming that the level planes are associated with color information, even the coded data representative of color information which actually do not exist would be outputted as exemplified by the level L2 on a line (n+1) and the level L2, L3 and L4 on a line (n+2), resulting in a slow coding rate.

Meanwhile, data coding systems include a two-dimensional compression system as described in CCITT Recommendation T.44.2 and designed for black-white facsimile. Most of Group 3 facsimile apparatuses rely on such a system. Although entirely new data compression systems may be devised, such would result in intricate and, therefore, expensive apparatuses. It is desirable from the economy standpoint, therefore, that color image signals be transmitted without resorting to drastic modification of existing coding devices.

SUMMARY OF THE INVENTION

It is therefore a first object of the present invention to provide a coding system for an image processing apparatus which enhances efficient coding without outputting needless coded data.

It is a second object of the present invention to provide a coding system for an image processing apparatus which codes image information consisting of numerous level planes without impairing the individuality of EOL codes or complicating the construction of the apparatus.

It is another object of the present invention to provide a simple and economical coding system which allows even an existing black-white facsimile apparatus to transmit color image signals without the need for substantial remodeling.

It is another object of the present invention to provide a generally improved coding system for an image processing apparatus.

In accordance with one aspect of the present invention, there is provided a coding system for reading image information in multiple levels, dividing the read image information into a plurality of level planes each covering image information of a same level, coding the image information level plane by level plane and a unit block at a time. The coding system comprises an adding circuit for adding identification data representative of any of the level planes to a head of coded data, and an omitting circuit for locating coded data associated with a predetermined one of the level planes at a head of the unit block and omitting coded data which does not include valid data from coded data associated with the other level planes.

In accordance with another aspect of the present invention, in a coding system for reading image information in multiple levels, dividing the read image information into a plurality of level planes each covering image information of a same level, coding the image information level plane by level plane and a unit block at a time, the improvement is provided wherein identification data to be added to heads of discrete coded data in order to discriminate the level planes from each other comprise codes which are used to code the level planes.

In accordance with another aspect of the present invention, there is provided a coding device for a color image processing apparatus which comprises a color detector for detecting a color, a color mode generator interconnected to the color detector for generating color information, and a memory assigned to a reference line for referencing lines color by color, the color detector being constructed to identify color information, a number of bits representative of the identified color information being inserted immediately before data which is included in a line-by-line code format.

The above and other objects, features and advantages of the present invention will become more apparent from the following detailed description taken with the accompanying drawings.

BRIEF DESCRIPTION OF THE DRAWINGS

FIG. 7 shows an output format of coded data produced by the apparatus of FIG. 6;

FIG. 8 is a block diagram of a coding section embodying the present invention and included in the apparatus of FIG. 6;

FIG. 9 is a block diagram showing a second embodiment of the coding section of FIG. 6;

FIG. 13 represents logics assigned to an AND gate which is included in the reader of FIG. 12;

FIG. 14 shows various color modes;

FIG. 16 shows a color code format in accordance with a third embodiment of the present invention.

DESCRIPTION OF THE PREFERRED EMBODIMENTS

While the coding system for an image processing apparatus of the present invention is susceptible of numerous physical embodiments, depending upon the environment and requirements of use, substantial numbers of the herein shown and described embodiments have been made, tested and used, and all have performed in an eminently satisfactory manner.

Figure 6:
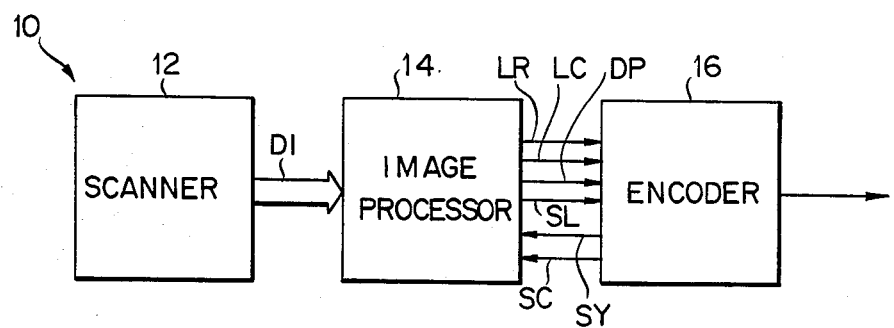
FIG. 6 is a block diagram of an image processing apparatus in accordance with the present invention.

Referring to FIG. 6, an image processing apparatus associated with a first embodiment of the present invention which is directed to achieving the first object is shown and generally designated by the reference numeral 10. The apparatus 10 includes a scanner 12 which reads halftone images out of a document in multiple levels and delivers the multi-level information in parallel to an image processor 14 as image signals DI each having a plurality of bits. Specifically, image signals DI representative of densities of their associated pixels in multiple levels are applied from scanner 12 to the image processor 14 in parallel streams. The image processor 14 temporarily stores the parallel inputs DI in line buffers (not shown) bit by bit. Upon receipt of a line sync signal SY from an encoder 16, the image processor 14 delivers a reference line signal LR and a coding line signal LC to the encoder 16 timed to a shift clock SC applied thereto from the encoder 16, starting with an image signal DI having a predetermined level (e.g. level 1 which is the lowest level). Immediately before the delivery of the reference and coding line signals LR and LC, the image processor 14 applies a level signal DP associated with the particular level to the encoder 16.

After the buildup of the line sync signal SY, the encoder 16 temporarily stores a level signal DP which has entered first and, thereafter, codes data of the coding line signal LC referencing the reference line signal LR. If no valid data is provided such as when the coded data results in a 2,048 white run-length, the encoder 16 does not output a level plane signal associated with those coded data and level signal DP. However, it does output a level plane signal and coded data insofar as the level signal DP is representative of a level plane which appears at the beginning of a unit block (in this case, the level plane associated with the level 1). If the coded data include valid data, the encoder 16 outputs a level plane signal and coded data. Coded data in this particular embodiment, therefore, will be outputted in the format shown in FIG. 7, in which the number of level planes is four.

In FIG. 7 where all the four level planes include valid data, coded data in the four level planes are sent out continuously as represented by a line n. If the level plane associated with a level 2 does not include valid coded data, for example, the coded data are sent out with the coded data in the level plane of the level 2 omitted as represented by a line (n+1). Further, the lines can be safely managed because at least the coded data in the level plane of the level 1 is delivered as represented by a line (n+2).

In this particular embodiment, since only the coded data out of one complete scanning line of coded data which is to be sent out first is set and the order of arrangement of the other level planes is free from restriction, the level planes except for the first may replace each other as represented by a line (n+3). Even in such a condition, the level planes can be readily discriminated from each other based on the level plane codes. Since the order of arrangement of the second to the last level planes is not restricted as mentioned, even an apparatus of the type processing image signals in different level planes in parallel is allowed to transmit coded data starting with a signal which has been processed first and, therefore, attains high-speed coding.

Referring to FIG. 8, a specific construction of the encoder 16 is shown. In FIG. 8, a controller 20 first makes the line sync signal SY high level in order to request the image processor 14 the transfer of data. As the controller 20 receives a level signal DP associated with a level plane which is outputted from the image processor 14 for the first time as previously described, it stores the level signal DP. Then, the controller 20 causes an initialize signal SI to rise to initialize a transition detector and two-dimensional encoder 22 and reset a run-length counter 24. When initialized, the detector encoder 22 applies the shift clock SC to the image processor 14 and the run-length counter 24 so that a reference line signal LR and a coding line signal LC are input to the detector and encoder 22 bit by bit. The detector and encoder 22 in turn searches for a point of transition in the coding line LC and, at the same time, two-dimensionally codes it referencing the content of the reference line signal LR. In the meantime, the run-length counter 24 counts up the shift clock SC.

Upon detection of a point of transition, the detector and encoder 22 interrupts the shift clock SC and applies a transition detection signal DD to the controller 20. In response to this signal DD, the controller 20 selects data outputted from a run-length code table 26 as coded data if the current coding mode is the one-dimensional coding (processing) mode, and coded data SD outputted from the detector and encoder 22 if it is the two-dimensional coding mode. Thereafter, the controller 20 makes a reset signal SR high level to reset the detector and encoder 22 and run-length counter 24. As a result, the counter 24 is reset to zero and the detector and encoder 22 resumes its operation.

The above-described sequence of events is repeated until one level plane is completed. After fully processing one level plane, the controller 20 makes the line sync signal SY high level again, repeating the procedure described above. At this instant, during coding the second to the last level planes in one scanning line, when the coded data has been found to be a 2,048 white run-length representative of invalid data in the one-dimensional coding mode or a codeword V(0) representative of invalid data in the two-dimensional coding mode, the controller 20 does not send out a level signal or coded data associated with that particular level plane. The controller 20 repeats such processing for each of the scanning lines to process all the images on a document.

A sync signal table 28 shown in FIG. 8 is adapted to store EOL and other predetermined sync signals. Data stored in the table 28 are read out by the controller 20.

As described above, in accordance with the first embodiment of the present invention, coded data in every unit block are delivered headed by a particular one which is associated with a predetermined level plane, while those of the coded data which lack valid data are omitted. This eliminates the delivery of needless coded data and, thereby, promotes efficient coding.

A second embodiment of the present invention which achieves the second object of the present invention will be described in detail with reference to FIG. 9, in which the same or similar structural elements are designated by like reference numerals.

Figure 1:
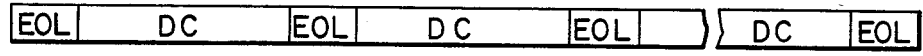
FIG. 1 shows an output format of coded data provided by one-dimensional coding mode.
Figure 2:
FIG. 2 shows an output format of coded data provided by a two-dimensional coding mode.
Figure 3:
FIG. 3 shows a data format provided by the one-dimensional coding mode and to which level plane codes are added.
Figure 4:
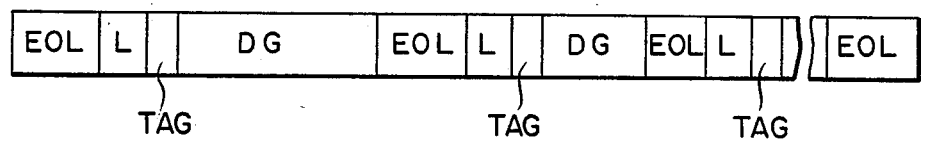
FIG. 4 shows a data format provided by the two-dimensional coding mode and to which level plane codes are added.
Figure 5:
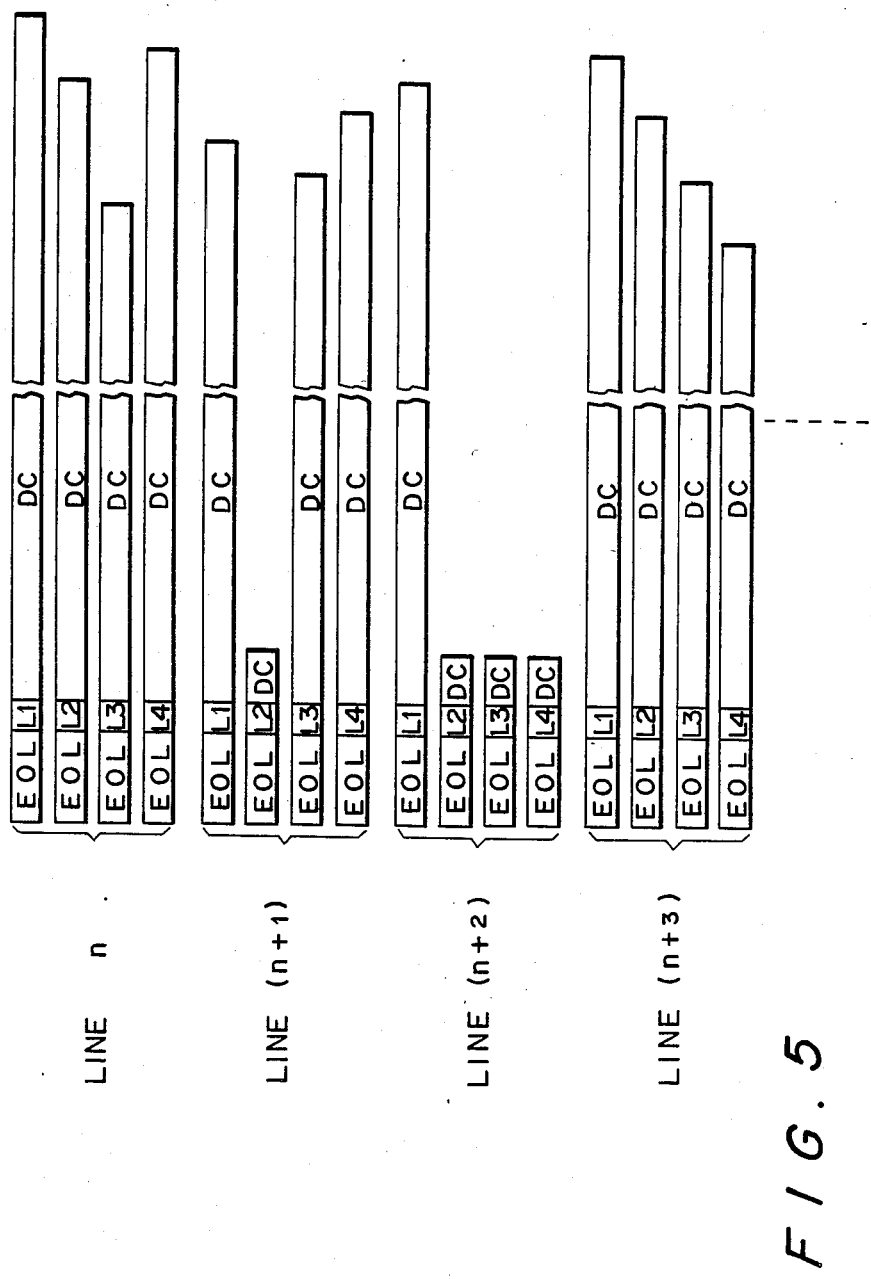
FIG. 5 shows an example of prior art output formats of coded data.

In FIG. 9, the image processor 14 is constructed such that when the image information of any line is all white, it outputs a skip line signal instead of a level signal DP and applies to the encoder 16 a skip line data SL representative of the number of lines to be skipped. The encoder 16 produces a run-length code associated with a level signal DP which has appeared for the first time after the rise of the line sync signal SY and, then, codes data carried by the coding line signal LC referencing the reference line signal LR. The output format assigned to the encoder 16 is the same as the ones shown in FIGS. 3 and 4. The image processor 14 delivers a level signal DP representative of level plane data which are the same in content as Table 1, except that the code "0000" is assigned to the skip line signal.

In the encoder 16 shown in FIG. 9, the controller 20 first makes the line sync signal high level to request the image processor 14 the transfer of data and, at the same time, makes a select signal SS high level to cause a selector 30 to select a signal which is applied to its input terminal 30. The signal being applied to the input terminal B is a level signal DP which is outputted from the image processor 14, the level signal DP thus being fed to the run-length code table 26. As a result, a level signal DP produced for the first time from the image processor 14 as mentioned above is applied to the run-length code table 26 to be converted thereby to a run-length code, or MH code, which is then routed to the controller 20.

Upon receipt of the run-length code, the controller 20 makes the select signal SS low level to cause the selector 30 to select a signal which is applied to its input terminal A. The signal being applied to the terminal A is the run-length data outputted from the run-length counter 24. In the subsequent stage, therefore, run-length data from the run-length counter 24 are applied to the run-length code table 26. Simultaneously, the controller 20 makes the initialize signal SI high level to initialize the transition detector and encoder 22 while resetting the run-length counter 24.

When initialized, the transition detector and encoder 22 delivers the shift clock SC to the image processor 14 and run-length counter 24 so as to be supplied with a reference line signal LR and a coding line signal LC bit by bit from the image processor 14. The transition detector and encoder 22 searches for a transition point in the coding line signal LC and, referencing the content of the reference line signal LR, two-dimensionally codes the coding line. In the meantime, the shift clock SC is counted by the run-length counter 24. Upon detection of a transition point, the transition detector and encoder 22 interrupts the shift clock and applies a transition detection signal DD to the controller 20.

In response to the signal DD, the controller 20 sends out output data of the run-length code table 26 as coded data if the current coding mode is one-dimensional, and coded data SD outputted from the transition detector an encoder 22 if it is two-dimensional. Thereafter, the controller 20 makes the reset signal SR high level to reset the run-length counter 24 and transition detector and encoder 22, with the result that the counter 24 is reset to zero and the transition detector an encoder 22 resumes its operation. If the level signal DP entered for the first time is a skip line signal, the controller 20 takes in skip line data SL to perform predetermined skip line processing.

Repeating the above procedure, the controller 20 fully codes one complete level plane of information. Then, it makes the line sync signal SY high level again in order to perform the same processing for the next level plane of data. When completed the processing of one scanning line, the controller 20 starts processing the next line.

As described above, in accordance with the second embodiment of the present invention, a run-length code associated with a level signal DP which is representative of a level plane is generated by the run-length code table 24 and that data is used as a level plane signal LP. Stated another way, the level signal DP is derived from data (codeword) which belongs to the coding system, preventing the individuality of EOL codes from being impaired. In addition, this particular embodiment realizes a significantly flexible apparatus because the number of level planes may be increased or decreased without modifying the coding system.

In summary, since the second embodiment of the present invention implements level plane identifying signals using codewords which are adapted to code level plane information, it is capable of coding image information which are in multiple level planes without effecting the individuality of EOL codes or without complicating the apparatus construction.

A third embodiment of the present invention which is constructed and arranged to achieve the third object will be described with reference to FIGS. 10–17.

Figure 10:
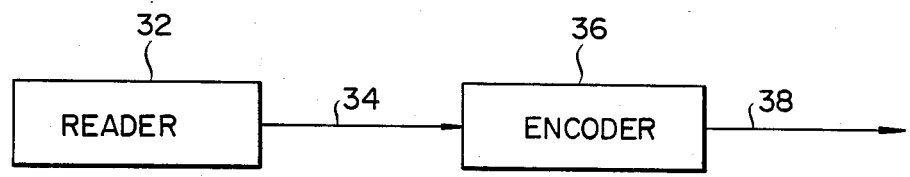
FIG. 10 is a schematic block diagram of a facsimile apparatus to which the present invention is applicable.

Referring to FIG. 10, the basic construction of a facsimile apparatus to which the third embodiment of the present invention is applied is shown. A reader 32 functions to read a document which carries character and graphic data thereon, thereby producing image information 34. An encoder 36, on the other hand, functions to code the image information 34 to provide coded information 38. First, the reader 32 reads information on the document line by line by means of a charge coupled device (CCD) or like photosensor and applies the information to the encoder 36 as binary image information 34, i.e. ZEROs and ONEs. For example, "white" in the image information 34 may be represented by a ZERO and "black" by a ONE. The number of bits per line is 1,728 bits or 2,048 bits. The encoder 36 detects a transition point of the image information 34 (a pixel at which black changes to white or white changes to black), then counts the run-length of white or black, and then codes the run-length. Alternatively, the encoder 36 may provide the coded information 38 by coding a position of the transition pixel or by inserting a sync signal, fill bits and others line by line.

Figure 11:
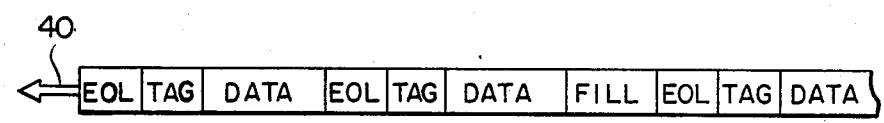
FIG. 11 shows a data format applicable to the apparatus of FIG. 10.
Figure 12:
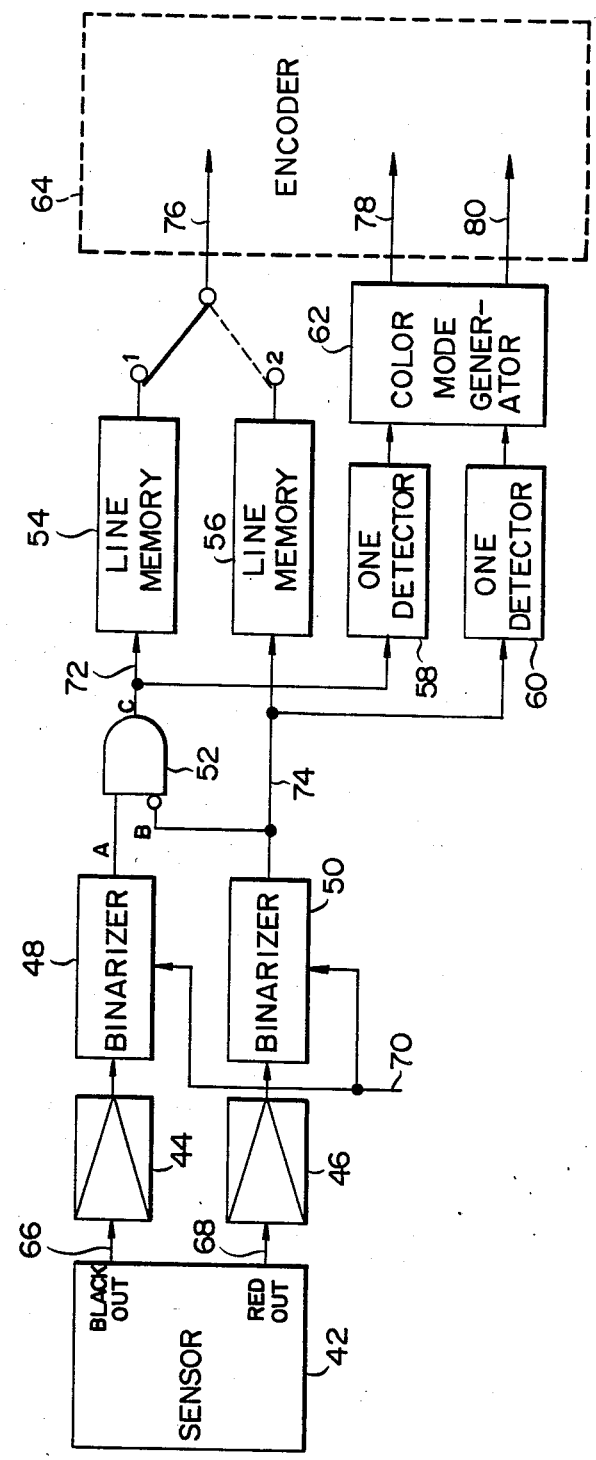
FIG. 12 is a block diagram of a reader of FIG. 10.

The coded informtion 38 mentioned above may be formatted as shown in FIG. 11. In the format shown in FIG. 11, the arrow 40 indicates the flow of data, EOL a sync code "000000000001", TAG a tag bit, DATA coded data, and FILL fill bits. The format of FIG. 11 accords also to the two-dimensional coding system described in CCITT Recommendation T.44.2. Hereinafter, a facsimile apparatus is assumed to be of the type which outputs information-carrying portions of a document as black or red and the others as white. Here, let "white" be as a color other than black and red, "black" a color other than white and red, and "red" a color other than white and black. FIG. 12 shows a construction of the reader 32, FIG. 13 the logics of an AND gate shown in FIG. 12, and FIG. 14 color modes.

As shown in FIG. 12, the reader 42 comprises a sensor 42 for converting image signals to analog electrical signals, amplifiers 44 and 46 for amplifying the electrical signals, binarizers 48 and 50 for transforming respectively amplified outputs of the amplifiers 44 and 46 into ZEROs and ONEs (digital signals), and AND gate 52, line memories 54 and 56, ONE detectors 58 and 60, a color mode generator 62, and an encoder 64.

First, the sensor 42 scans a document line by line to convert image information to an analog electrical signal, a white/black signal appearing on an output line 66 and a red signal appearing on an output line 68. The white/black signal is applied to the amplifier 44 and the red signal to the amplifier 46. The amplified outputs of the amplifiers 44 and 46 are applied to the binarizers 48 and 50, respectively. The binarizers 48 and 50, timed to a sampling clock 70, binarize the incoming analog signals and, then, deliver the resulting binary signals to the AND gate 52 which functions to discriminate white, black and red from each other. The white, black and red signals (image information) outputted from the AND gate 52 and binarizer 50 respectively are routed to the line memories 54 and 56 over lines 72 and 74. On the line 72, white and red appear as ZEROs and black appears as a ONE; on the line 74, white and black appear as ZEROs and red appears as a ONE. Therefore, a white line is represented by a ZERO on both the lines 72 and 74. Where black and red exist at the same time on any of the lines, both the lines 72 and 74 include a ONE.

The image information on the lines 72 and 74 are temporarily stored in the line memories 54 and 56 one line each. Simultaneously, ONEs on the lines 72 and 74 respectively are checked by the ONE detectors 58 and 60 the outputs of which are commonly applied to the color mode generator 62. When the line memories 54 and 56 deliver image information to the encoder 64 over an image information line 76, the color mode generator 62 delivers to the encoder 64 a color mode ZERO signal CM0 over a color mode ZERO line 78 and a color mode ONE signal CM1 over a color mode ONE line 80.

In the event of delivery of data to the image information line 76, if no ONE exists either in the line memory 54 or in the line memory 56, meaning that the line is all white, the color mode generator 62 produces that condition as the color mode ZERO signal CM0 and color mode ONE signal CM1 and the content of the line memory 54 is applied to the image information line 76.

When a ONE exists only in the line memory 54, the color generator 62 outputs such a condition as the signals CM0 and CM1 and the content of the line memory 54 is delivered over the image information line 76.

When a ONE exists only in the line memory 56, the color mode generator 62 outputs such a condition as the signals CM0 and CM1 and the content of the line memory 56 is applied to the image information line 76.

When a ONE exists in both the line memories 54 and 56, first the content of the line memory 54 is applied to the line 76 and then the content of the line memory 56.

At the instant when the content of the line memory 54 or that of the line memory 56 is fed over the line 76, that condition is indicated by the signals CM0 and CM1.

Concerning the logics assigned to the AND gate 52 shown in FIG. 12, the logical value on the line 72 is determined as shown in FIG. 13.

As shown in FIG. 14, a white line is delivered from the line memory 54 with the color mode ZERO signal CM0 turned to ZERO and the color mode ONE signal CM1 turned to ONE. A line carrying black or white information only is delivered from the line memory 54 with the signal CM0 turned to ZERO and the signal CM1 turned to ONE. A line carrying red information only is delivered from the line memory 56 with the signal CM0 turned to ONE and the signal CM1 to ZERO. Further, as to a line carrying both black and red information, first the content of the line memory 54 is delivered with the signal CM0 turned to ZERO and the signal CM1 turned to ONE and, then, the content of the line memory 56 with both the signals CM0 and CM1 turned to ONE.

Figure 15:
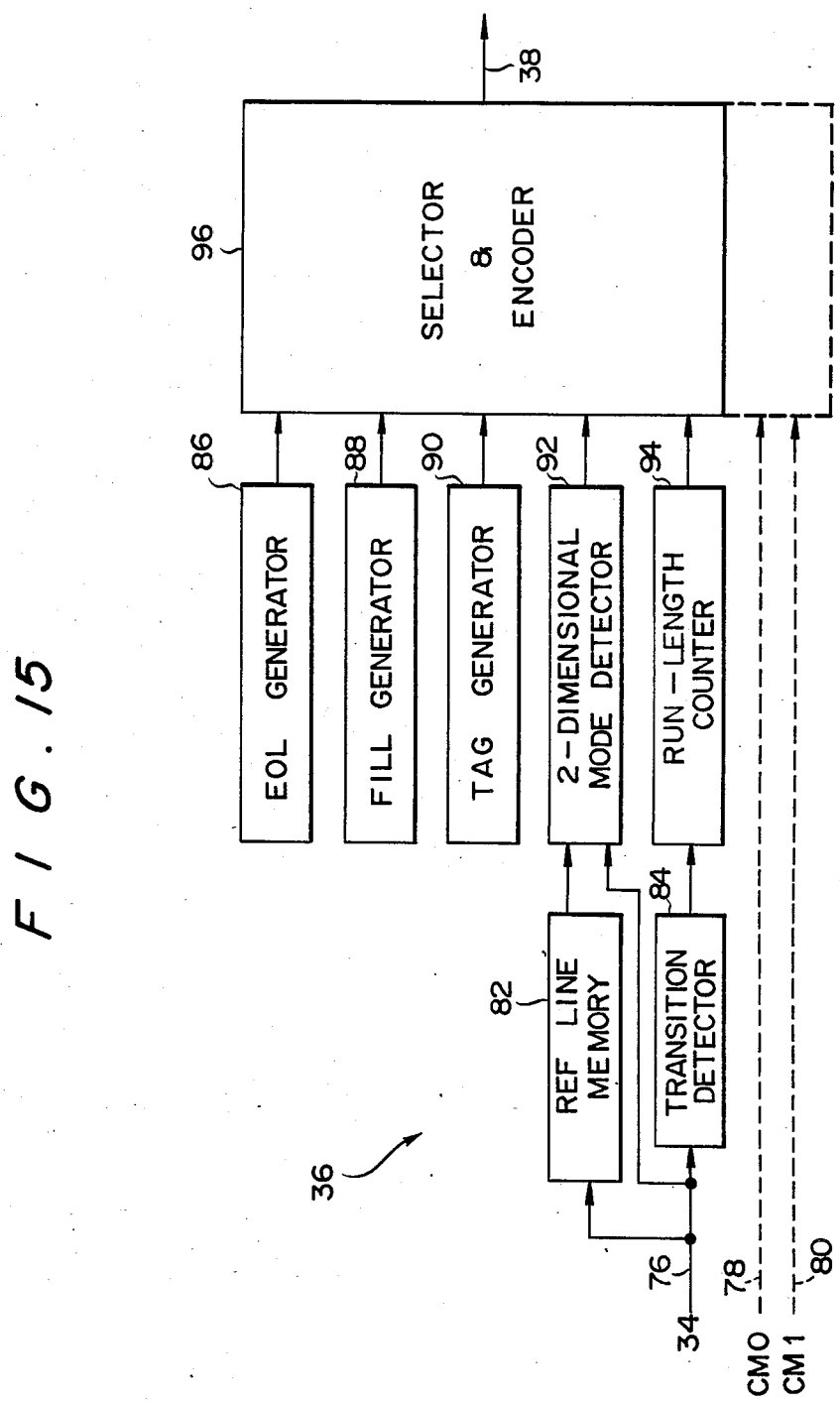
FIG. 15 shows a basic construction of a coding system embodying the present invention.
Figure 17:
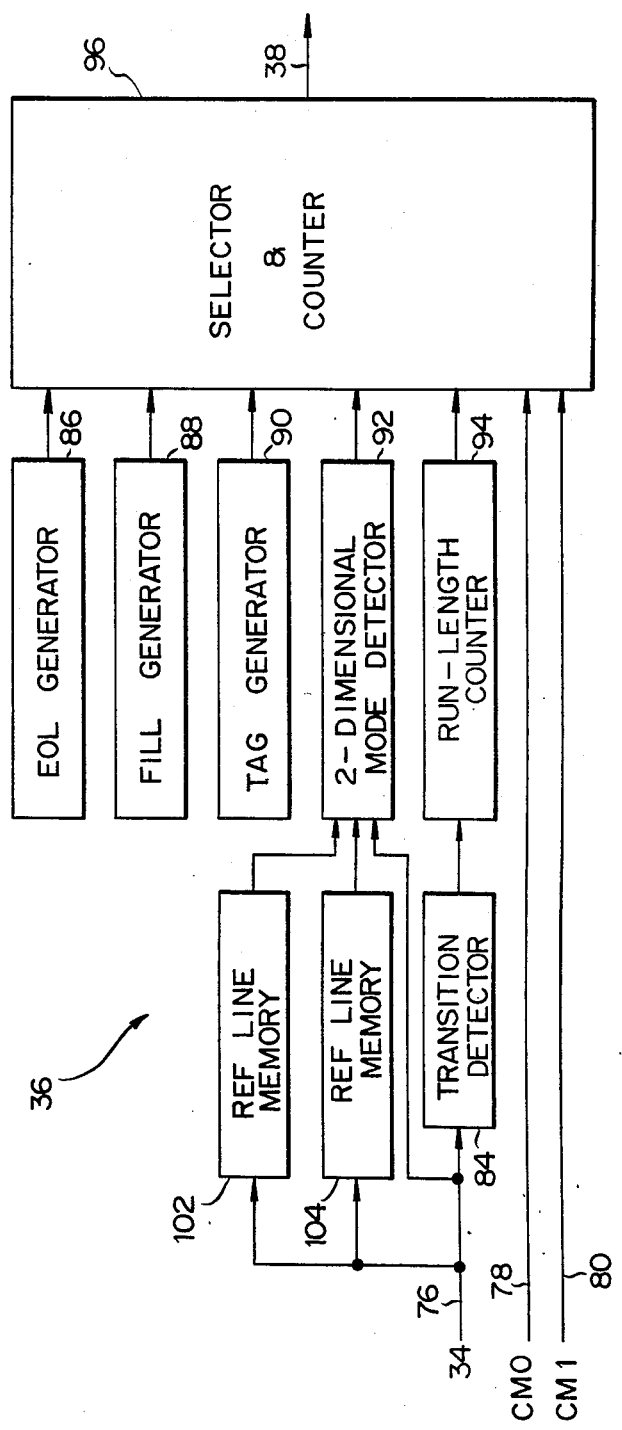
FIG. 17 shows a modification to an encoder shown in FIG. 15.

Referring to FIG. 15, a basic construction of the encoder 36 in accordance with the illustrative embodiment is shown. A color code format associated with the encoder 36 is shown in FIG. 16, and a modification to the encoder 36 in FIG. 17. The encoder 36 in FIG. 15 comprises a memory 82 assigned to a reference line, a transition point detector 84, an EOL generator 86, a FILL generator 88, a TAG generator 90, a two-dimensional mode detector 92, a run-length counter 94, and a selector and encoder 96.

In operation, image information provided by the reader 32 is applied to the transition detector 84 which is adapted to detect transition points, or pixels. The image information is also applied to the reference line memory 82. Subsequently, image information associated with the preceding line is outputted from the memory 82 to be applied to the two-dimensional mode detector 92 together with image information associated with the current line. Meanwhile, the image information outputted from the transition detector 84 is applied to the run-length counter 94 which then counts up the run-length between transition points, or pixels. Finally, the selector and encoder 96 codes the input information to provide coded data 38.

In detail, the selector and encoder 96 is supplied with an EOL code from the EOL generator 86 to add it to the coded data 38. When the line is to be one-dimensionally coded, the selector and encoder 96 adds a ONE supplied thereto from the TAG generator 90 to the coded data 38; when the line is to be two-dimensionally coded, it adds a ZERO. Further, the selector and encoder 96 is supplied with an output of the two-dimensional mode detector 92 and that of the run-length counter 94 to code and add them to the coded data 38. If necessary, the selector and encoder 96 may insert FILL bits provided by the FILL generator 88 before the EOL code. Such a procedure provides a code format as shown in FIG. 11.

The construction and operation described so far is known in the art. A characteristic feature of this particular embodiment is that the bits assigned to the previously discussed color mode ZERO signal CM0 or the color mode ONE signal CM1 is positioned immediately before coded data DATA, thereby providing a color code format as shown in FIG. 16. Specifically, the format shown in FIG. 16 includes a color mode ZERO bit 98 and a color mode ONE bit 100 in addition to those bits which are shown in FIG. 11. Hence, as indicated by phantom lines in FIG. 15, even an existing encoder is capable of producing color image signals if provided with an arrangement for inputting and outputting the color mode signals CM0 and CM1, that is, without the need for substantial remodeling.

The construction shown in FIG. 15 is designed for one-dimensional coding. That is, since the reference line memory 82 accommodates only one line, if the memory 82 is exclusively assigned to black lines, for example, a reference line memory for red lines is not available and, hence, red lines cannot be coded but two-dimensionally. In light of this, the encoder 36 shown in FIG. 17 includes a first reference line memory 102 and a second reference line memory 104 so that both the black and red lines may be two-dimensionally coded. In this case, the reference line will be the preceding black line or the preceding red line. Also, as to a line carrying black information only, the memory assigned to red reference lines will be made all ZEROs and, as to a line carrying red information only, the memory assigned to black reference lines will be made all ZEROs. Such effects two-dimensional coding and, thereby, allows color image signals to be transmitted with a desirable data compression efficiency.

As described above, the third embodiment of the present invention makes it possible to readily and economically compress and transmit color images signals using a black-white facsimile apparatus and without substantially remodeling a data compression device of the apparatus.

Various modifications will become possible for those skilled in the art after receiving the teachings of the present disclosure without departing from the scope thereof.

What is claimed is:

1. A coding system for reading image information in multiple density levels, dividing the read image information into a plurality of level planes each covering image information of the same density level, sequentially coding predetermined blocks of image information wherein each of said blocks is associated with one of said density levels, said coding system comprising:

adding means for adding identification data representative of respective ones of said level planes wherein said identification data is added before coded data associated with said ones of said planes; and means for locating coded data associated with a predetermined one of said level planes based on said added identification data at the beginning of said coded data and means for omitting coded data which does not include valid data from any coded data associated with those of said level planes containing valid data.

2. The coding system according to claim 1 wherein said identification data at the beginning of said coded data for each of said levels is one of a series of codes which are used to code said density level planes.

3. A coding device for a color image processing apparatus, comprising:

color detector means for detecting the color;

color mode generator means interconnected to said color detector means for generating color information;

at least one memory means assigned respectively to each one of at least one reference line wherein each of said reference lines is associated with a respective color and wherein said memory means is connected to said color detector means and wherein said color detector means further includes a means for identifying color information and a means for inserting a number of bits representative of said identified color information immediately before data which is included in a line-by-line code format.

* * * * *